Patented Feb. 17, 1925.

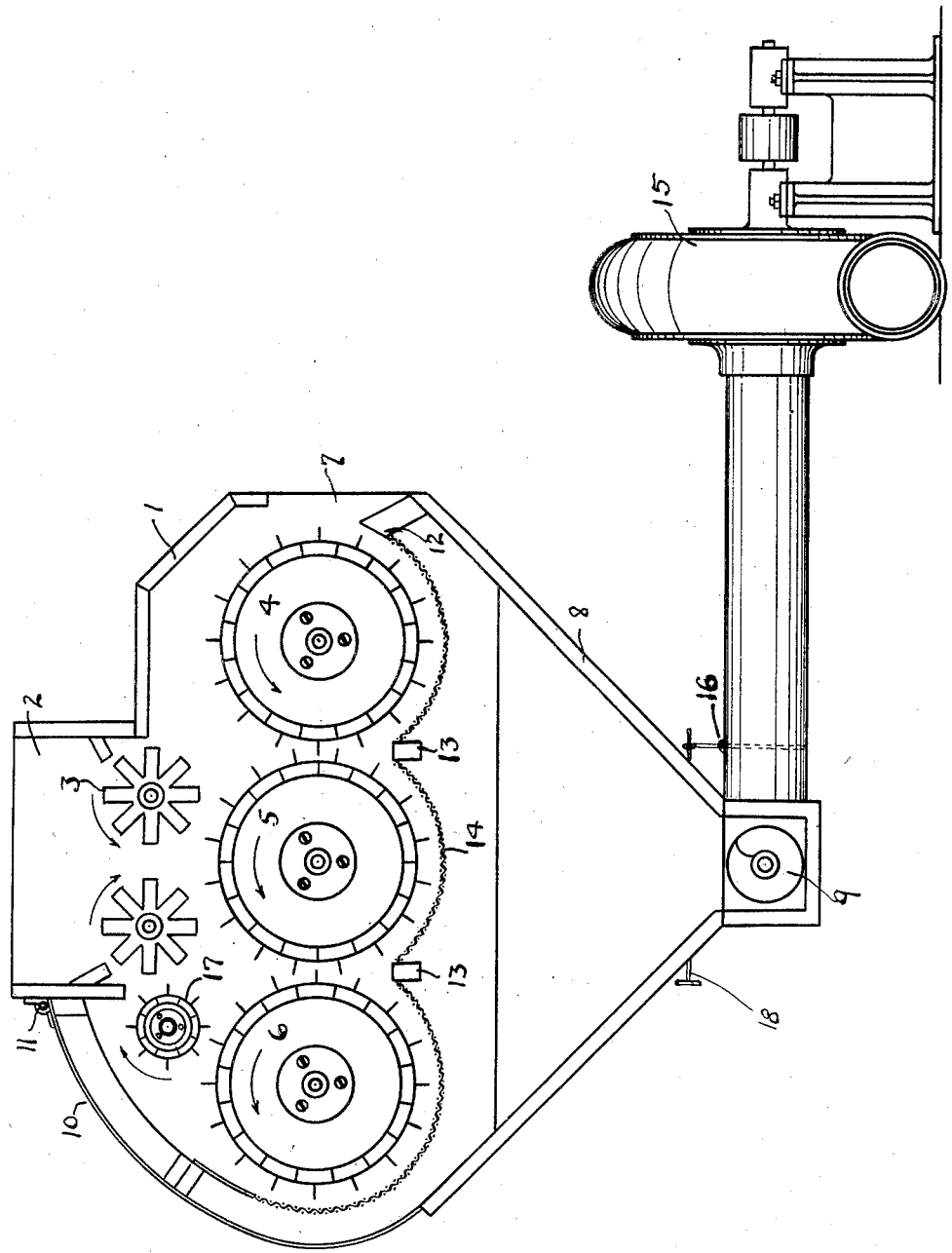

1,526,393

UNITED STATES PATENT OFFICE.

JOHN ARNOLD STREUN, OF SHERMAN, TEXAS, ASSIGNOR TO HARDWICKE-ETTER COMPANY, OF SHERMAN, TEXAS.

COMBINED FEEDER AND TRASH ELIMINATOR FOR COTTON.

Application filed April 25, 1924. Serial No. 708,962.

*To all whom it may concern:*

Be it known that I, JOHN A. STREUN, a citizen of the United States, residing at Sherman, Grayson County, Texas, have invented certain new and useful Improvements in Combined Feeders and Trash Eliminators for Cotton, of which the following is a specification.

My invention relates to a device for feeding cotton to the gin, said device being so constructed as to eliminate the dirt and trash from the cotton on its passage through the feeder. This provides a cleaner and higher grade of cotton, thus enhancing the price of the staple.

It is an object of the invention to provide an apparatus whereby the seed cotton can be agitated and evenly distributed, and the trash and dirt efficiently eliminated from the cotton so that it may be fed to the gin rapidly and uniformly.

It is desired to so feed the seed cotton to the gin that the gin can more easily handle the same and better eliminate the seeds and hulls, so as to produce a better grade of cleaned cotton as it comes from the gin.

A further object is to subject the cotton to a large screening action without the necessity of greater agitation and machining of the cotton than is necessary to break up the dirt and chaff so that it may be eliminated from the cotton.

Referring to the drawing herewith I have shown a side elevation of a cleaner-feeder embodying my invention with the side of the casing removed therefrom to show the interior thereof, the cylinders being shown in end elevation.

Like numerals of reference are applied to like parts in all the views.

In carrying out my invention, I contemplate feeding the cotton to picker cylinders arranged to carry the cotton over a large screening area and to so arrange the cylinders and screen that a suction fan may be most efficiently employed to assist in eliminating the dirt and chaff therefrom.

The picker cylinders are mounted in a casing 1 having an open hopper 2 at the upper end to which the cotton is fed. Two feeding rolls 3 in the lower end of said hopper receive the cotton and, by rotating in opposite directions carry the cotton down between them. In so doing they compress the cotton into a uniform bat.

Below the feeding rollers are a plurality of picker cylinders, of which I have shown three, mounted on shafts journalled for rotation in the casing. Said three cylinders are arranged in parallel relation and adapted for rotation in the same direction, counter-clockwise, as shown in the drawing. There is a forward cylinder 4, a middle cylinder 5 directly below the feeder rolls; and a rear cylinder 6.

The casing has a discharge opening 7 which may be connected to a gin hopper or a distributer as desired. The casing below said cylinders slopes downwardly at 8 and has a screw conveyer 9 working in a trough formed at the lower end, said conveyor acting to remove the trash and dirt from the casing. To the rear of the hopper 2 the casing is formed with a door 10, hinged at 11 to be lifted upwardly to expose the interior when occasion arises.

There is a foraminated screen 14 secured to the sides of the casing beginning at a point somewhat above the central line of the cylinder 6 and extending in uniformly spaced relation close to the lower sides of the cylinders to the forward side of the casing where it is attached at 12 to the mouth of the chute 7. Cross bars 13 between adjacent cylinders serve to support the screen between its ends.

To the rear of the feeding rollers and spaced closely above the rear cylinder 6 is an agitating roller 17. The agitator is made up of a cylindrical roller having radial spikes or teeth thereon to break up the wads of cotton and distribute it evenly. The roller rotates in a clockwise direction opposite to the direction of rotation of the cylinders.

The bat of cotton fed slowly into the cleaner, is caught by the spikes on the cylinder 5 and carried to the rear of the casing where it is caught by the teeth of cylinder 6 and carried around the same. The agitator roller rotates at a slower peripheral speed than the cylinders and acts to prevent large wads or locks of cotton from being carried over without being broken up. The cotton is thereby more evenly distributed and so broken and fluffed up that the dirt and chaff can be more readily removed. The cotton is then carried around beneath the cylinders and over the screen 14 where the dirt and chaff tend to settle out.

To assist in removing the impurities from the cotton as it passes over the screen 14, I contemplate employing a suction device, shown diagrammatically at 15, connected by pipe 16 to the lower end of the casing, about centrally of the conveyor trough. It is desired to obtain an evenly distributed draft downwardly through the screen, and this may be obtained as shown or by connection with a suction device at each end of the casing as may be desired.

It will be noted that the cylinders are arranged in the casing in horizontal alignment with the screen below them in an advantageous position, directly above the suction fan inlet, so that the usual tendency of the dirt and chaff to settle out when rubbed over the screen will be greatly increased. There is thus provided a large screen surface over which the cotton is carried in an evenly distributed flow after the lumps or wads have been broken up to allow the dirt to drop out. This, in conjunction with the downward draft caused by the fan will efficiently eliminate all the impurities thereby delivering the cotton in an even flow of clean staple.

The suction draft from the fan may be regulated as desired by a valve or damper 16 in the pipe, said damper being operated through a rod 18 or any desired means. The advantages of this construction will be readily understood without further detailed consideration.

What I claim as new, and desire to protect by Letters Patent is:

1. In a cotton cleaner feeder, the combination of a casing, two feeding rolls, three picker cylinders rotatable in said casing at a level below said rolls to carry the cotton over the tops thereof to the rear, an agitator roller above the rear one of said cylinders to break up the cotton, a screen spaced uniformly below said cylinders, and a suction device acting to draw air downwardly through said screen and said cotton.

2. In a cotton cleaner feeder, the combination of a casing, a plurality of picker cylinders arranged in horizontal alignment in said casing to rotate in the same direction, feeding rolls centrally above said cylinders, an agitating and distributing roller above one of said cylinders, a screen spaced uniformly below said cylinders over which the cotton is passed, and a suction device centrally below said screen for the purpose described.

3. In a cotton cleaner feeder, the combination of a casing, parallel picker cylinders journalled for rotation therein in the same direction, means to feed cotton to the said cylinders centrally of said casing, agitating means above one of said cylinders to break up and distribute the cotton, a screen below said cylinders and means to draw the impurities from said cotton as it is passed over said screen.

4. In a cotton cleaner feeder, the combination of a casing, parallel picker cylinders journalled for rotation therein in the same direction, means to feed cotton on to said cylinders, an agitator roll above said cylinders to break up the cotton above said cylinders, a screen below said cylinders, and a suction means centrally below said screen to remove the dirt and trash from said cotton as it is passed over said screen.

In testimony whereof I hereunto affix my signature this 15th day of April A. D. 1924.

JOHN ARNOLD STREUN.